| United States Patent [19] | [11] | 4,381,391 |
|---|---|---|
| Chen et al. | [45] | Apr. 26, 1983 |

[54] INTERFACIAL PROCESS FOR PREPARING POLYAROMATIC ESTERS

[75] Inventors: Paul Y. Chen, Dayton, Ohio; Carl S. Marvel, Tucson, Ariz.

[73] Assignee: The United States of America as represented by the Secretary of the Air Force, Washington, D.C.

[21] Appl. No.: 239,961

[22] Filed: Mar. 3, 1981

[51] Int. Cl.³ ............................................. C08G 63/24
[52] U.S. Cl. .................................... 528/173; 528/191; 528/193; 528/194
[58] Field of Search ................ 528/173, 191, 193, 194

[56] References Cited

U.S. PATENT DOCUMENTS 3,786,022  1/1974  Hata et al. ............................ 528/191
4,118,372 10/1978  Schaefgen ............................ 528/191
4,183,895  1/1980  Luise ..................................... 528/191

Primary Examiner—Lester L. Lee
Attorney, Agent, or Firm—Donald J. Singer; William J. O'Brien

[57] ABSTRACT

New, easily processable, polyaromatic esters were prepared from 2,2'-diiododiphenyl-4,4'-dicarbonyl dichloride, isophthaloyl chloride and/or terephthaloyl chloride in combination with 4,4'-isopropylidene diphenol, 4,4'-sulfonyldiphenol, or resorcinol by interfacial condensation. In these polymers, phenylacetylenyl groups can be easily introduced into the polymer chain by replacing the iodine. This process leads to soluble and curable polymers from which films can be prepared. After curing the polymers are insoluble and show excellent thermal and chemical resistance. The curing process increases the polymers' softening temperature about 20° C.

12 Claims, No Drawings

4,381,391

INTERFACIAL PROCESS FOR PREPARING POLYAROMATIC ESTERS

STATEMENT OF GOVERNMENT INTEREST

The invention described herein may be manufactured and used by or for the Government for governmental purposes without the payment of any royalty thereon.

BACKGROUND OF THE INVENTION

This invention relates to a series of novel polymeric compounds and to a method for their preparation. In a more particular aspect, this invention concerns itself with novel polyaromatic esters curable by intramolecular cyclization.

Polymeric materials with cyclic structures on either the chain backbone or side groups usually have good thermal stability and high heat resistance. These factors, however, contribute to the low solubility and high melting temperature characteristics exhibited by these polymers thus making their processability a problem.

For example, it is known that polymers, such as polyphenylquinoxalines and aromatic polyether-keto-sulfones, which contain 2,2'-di(phenylethynyl) biphenyl units show increased chemical and heat stability after thermal curing. The curing process has been described as two adjacent phenylacetylenyl groups undergoing intramolecular cyclization to form 9-phenyl benzanthracene units. The intramolecular cyclization of phenylethynyl groups present in the polymer contributes considerably to its rigidity and thermal stability. However, the poor processability of such materials constitutes a problem which limits their usefulness. The present invention, therefore, was directed toward a solution to that problem and the development of easily processable novel polyaromatic esters with good stability before curing and with improved thermal and chemical resistance after curing. As a consequence, it was found that novel polyaromatic esters could be developed which possessed the requisite stability before curing and improved thermal and chemical resistance after curing in order to overcome the processability problems associated with prior art polyesters.

SUMMARY OF THE INVENTION

The present invention concerns itself with novel polyaromatic esters which possess the thermal and chemical characterisitcs necessary to overcome the processability problems encountered heretofore in utilizing these type of materials for industrial applications. The novel polymers of this invention are synthesized by effecting a two-phase reaction between an acid chloride selected from the group consisting of 2,2'-diiododiphenyl -4,4'-dicarbonyl dichloride, isophthaloyl chloride and terephthaloyl chloride; and a diphenol selected from the group consisting of 4,4'-isopropylidenediphenol, 4,4'-sulfonyldiphenol and resorcinol. Polyesters containing a desirable phenylethynyl group can then be synthesized by reacting the novel aromatic polyester with cuprous phenylacetylide in accordance with conventional procedures.

Accordingly, the primary object of this invention is to provide novel polyaromatic esters that are easily processable.

Another object of this invention is to provide novel aromatic ester polymers that are characterized by good stability before curing and improved thermal and chemical characteristics after curing.

Still another object of this invention is to provide novel aromatic ester polymers that are curable by intramolecular cyclization.

The above and still other objects and advantages of the present invention will become more readily apparent upon consideration of the following detailed description thereof.

DESCRIPTION OF THE PREFERRED EMBODIMENT

In accordance with this invention, it has been found that the above-defined objects can be accomplished by effecting a reaction between a mixture of an acid chloride and a dihydric phenol to produce polymers of high molecular weight and good solubility. The polymers are the polyesters of 2,2'-diiododiphenyl -4,4'-dicarbonyl dichloride, terephthaloyl chloride and isophthaloyl chloride in combination with 4,4'-isopropylidenediphenol, 4,4'-sulfonyldiphenol and resorcinol. They were synthesized by means of a two-phase polycondensation reaction.

The monomeric materials utilized in the synthesis of the polyesters of this invention were prepared in the following manner. The 2,2'-diiododiphenyl-4,4'-dicarbonyl dichloride monomer (I) was conventionally prepared at 88% yield from dimethyl diphenyl-4,4'-dicarboxylate. m.p. 118°–119° C. (lit. 116°–117° C.⁵). The isophthaloyl chloride monomer (II) was recrystallized four times from n-hexane, m.p. 42°–43° C., while the terephthaloyl chloride monomer (III) was recrystallized four times from n-hexane. m.p. 81°–82° C. The 4,4'-isopropylidenediphenol monomer (IV) was recrystallized two times from toluene. m.p. 159°–160° C. The 4,4'-sulfonyldiphenol monomer (V) was recrystallized from benzene-ethanol mixture. m.p. 249°–250° C. and the resorcinol monomer (VI) was recrystallized from toluene. m.p. 110°–111° C.

The polymeric materials of this invention are synthesized by effecting a polycondensation reaction between an acid chloride selected from the group consisting of 2,2'-diiododiphenyl-4,4'-dicarbonyl dichloride, terephthaloyl chloride and isophthaloyl chloride; and a dihydric phenol selected from the group consisting of 4,4'-isopropylidenediphenol, 4,4'-sulfonyldiphenol, and resorcinol.

The reactions referred to above are further illustrated by the following reaction scheme A, B and C.

SCHEME A

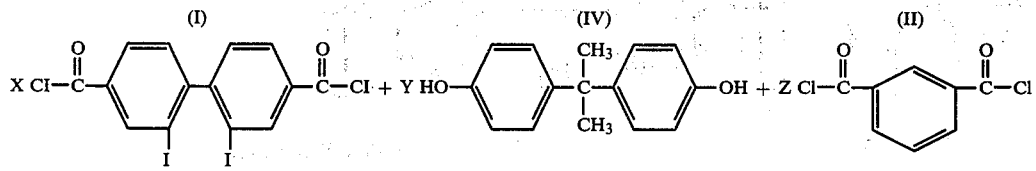

-continued
SCHEME A
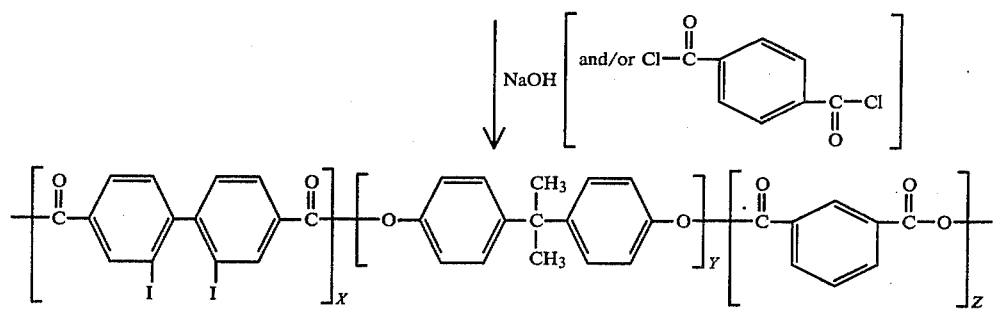
Where X + Z = Y       + (X + Y + Z) NaCl
SCHEME B
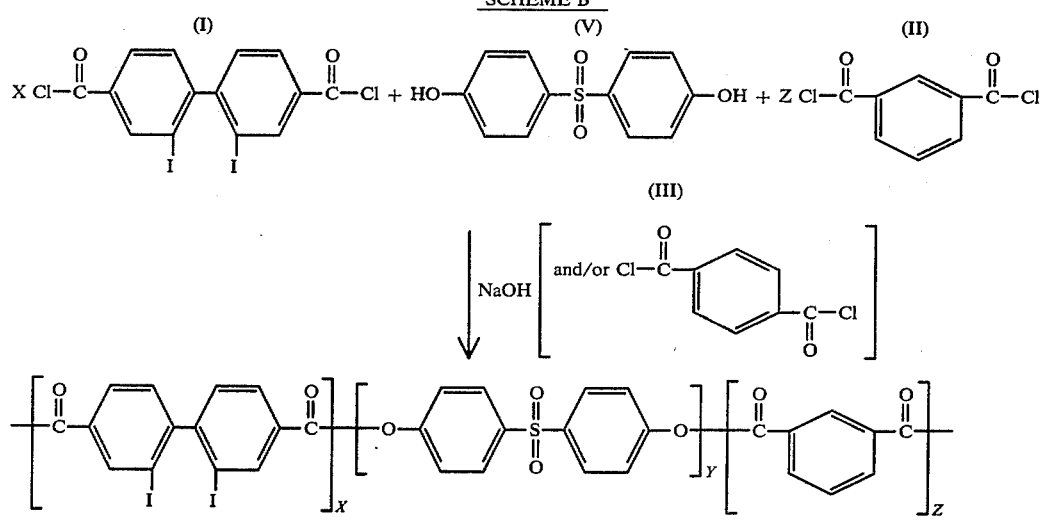
where X + Z = Y      + (X + Y + Z) NaCl
SCHEME C
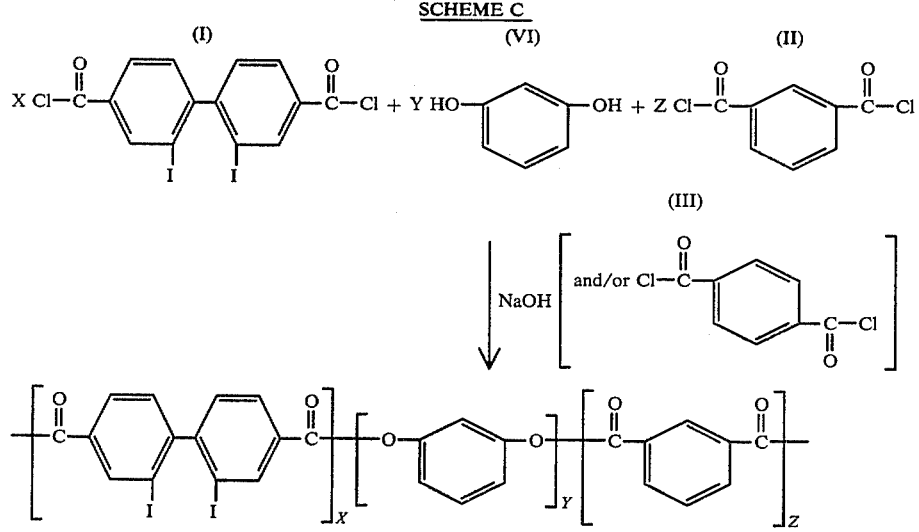
where X + Z = Y      + (X + Y + Z) NaCl In reaction schemes A, B and C, the letters X, Y and Z are integers representing the moles of each of the reaction constituents such that the moles of X+Z are equal to Y and X+Y+Z represent the moles of NaCl pulled out.

The general preparation of the aromatic polyesters of this invention is further illustrated by the following example. Although this example is limited to specific reaction constituents; namely, those disclosed in scheme C, it should be understood that the use of the reaction constituents of schemes A and B can be substituted for those shown in the example.

EXAMPLE I

A solution of 0.02 mole bisphenol A (or bisphenol S, or resorcinol) and 1.6 g (0.04 mole) sodium hydroxide in 150 ml. water is prepared in a household blender at very low speed, stirring. The sodium hydroxide should be added as a standardized carbonate-free solution since this will give a more accurate titre of alkali than weighing out pellets. A second solution of 0.02 mole acid chloride (2,2'-diiododiphenyl-4,4'-dicarbonyl dichloride, terephthaloyl chloride and/or isophthaloyl chloride) in 75 ml. chloroform (dry, alcohol free) is prepared in a 150 ml beaker. To the solution in the blender is now added 15 ml of a 10% aqueous solution of sodium lauryl sulfate and the blender is turned to a maximum speed. The chloroform solution of the acid chlorides is added immediately and as rapid as possible to the well-stirred aqueous solution. The emulsion so formed is stirred for 5 minutes and the blender is stopped. The emulsion mixture is poured into 1.5 l. of acetone to coagulate the polymer and extract the solvents. The polymer is filtered and washed once on the filter with acetone. The granular polymer is transferred back to the blender jar and washed in 500 ml of water to remove the salt and dispersing agent. The solid polymer is filtered again and washed on the filter with water. The water washing step is repeated twice more and the polymer is given a final wash with acetone. The polymer is dried in a vacuum oven at 100° C. overnight. Elemental analyses of the polymer of this example as well as the other polymers illustrated in schemes A and B are shown in Table I.

Table II which follows discloses the solubility and viscosity of the polymers of this invention.

It can be observed that the 1,1,2,2-tetrachloroethane is the only good solvent. Also the polymers with the higher amount of terephthaloyl chloride give the higher molecular weight, and the polymers with sulfonyl groups result in better solubility. However, the polymer containing resorcinol is insoluble.

Once polymers are made having high viscosities and good solubilities, further reactions can be carried out. As was stated heretofore, the presence of a phenylethynyl group in the polymer chain contributes considerably to the polymer's rigidity and thermal stability after thermal curing of the polymer.

TABLE I

Elementary Analysis Results of Polymers Prepared from 2,2'-Diiododiphenyl-4,4'-Dicarbonyl Dichloride (I), Isophthaloyl Chloride (II), Terephthaloyl Chloride (III), 4,4'-Isopropylidenediphenol (IV), 4,4'-Sulfonyldiphenol (V), and Resorcinol (VI).

| | Acid Chloride (moles) | | | Diol (moles) | | | Analysis | | | | | |
|---|---|---|---|---|---|---|---|---|---|---|---|---|
| | | | | | | | Calcd. (%) | | | Found (%) | | |
| Polymer | I | II | III | IV | V | VI | C | H | S | C | H | S |
| P-I | 0.001 | 0.0095 | 0.0095 | 0.02 | — | — | 74.67 | 4.87 | | 74.90 | 4.92 | |
| P-II | 0.001 | — | 0.019 | 0.02 | — | — | 74.67 | 4.87 | | 75.36 | 4.90 | |
| P-III | 0.001 | 0.019 | — | 0.02 | — | — | 74.67 | 4.87 | | 76.05 | 4.91 | |
| P-IV | 0.001 | — | 0.019 | — | 0.02 | — | 61.45 | 3.07 | 8.08 | 60.88 | 3.03 | 8.16 |
| P-V | 0.001 | 0.019 | — | — | 0.02 | — | 61.45 | 3.07 | 8.08 | 61.21 | 3.05 | 8.15 |
| P-VI | 0.001 | 0.0095 | 0.0095 | — | 0.02 | — | 61.45 | 3.07 | 8.08 | 61.47 | 3.05 | 7.90 |
| P-VII | 0.001 | — | 0.019 | — | — | 0.02 | 66.93 | 3.29 | | 68.21 | 3.20 | |
| P-VIII | 0.001 | 0.019 | — | — | — | 0.02 | 66.93 | 3.29 | | 68.92 | 3.24 | |
| P-IX | 0.001 | 0.0095 | 0.0095 | — | — | 0.02 | 66.93 | 3.29 | | 68.68 | 3.24 | |

TABLE II

| | Acid Chloride (moles) | | | Diol (moles) | | | | | | | inh at 30° C. |
|---|---|---|---|---|---|---|---|---|---|---|---|
| Polymer | I | II | III | IV | V | VI | DMF[a] | Pyridine | H SO | TCE[b] | in TCE |
| P-I | 0.001 | 0.0095 | 0.0095 | 0.02 | — | — | 6[c] | 6 | 6 | S[d] | 0.62 |
| PII | 0.001 | — | 0.019 | 0.02 | — | — | 6 | 6 | 6 | S | 0.79 |
| P-III | 0.001 | 0.019 | — | 0.02 | — | — | 6 | 6 | 6 | S | 0.58 |
| P-IV | 0.001 | — | 0.019 | — | 0.02 | — | SW[e] | S | SW | S | 0.63 |
| P-V | 0.001 | 0.019 | — | — | 0.02 | — | SW | S | SW | S | 0.52 |
| P-VI | 0.001 | 0.0095 | 0.0095 | — | 0.02 | — | SW | S | SW | S | 0.59 |
| P-VII | 0.001 | — | 0.019 | — | — | 0.02 | i[f] | i | i | i | — |
| P-VIII | 0.001 | 0.019 | — | — | — | 0.02 | i | i | i | i | — |
| P-IX | 0.001 | 0.0095 | 0.0095 | — | — | 0.02 | i | i | i | i | — |

[a] DMF = N,N—dimethylformamide
[b] TCE = 1,1,2,2-tetrachloroethane
[c] 6 = slightly soluble
[d] S = soluble
[e] SW = swollen
[f] i = insoluble It is also known that phenylethynyl containing polymers, such as 2,2'-di(phenylethynyl)biphenyl, upon heating, undergo intramolecular cyclization to form 9-phenyl dibenzanthracene derivatives. Unfortunately, considerable difficulty is encountered in attempting to introduce phenylethynyl groups within or on the polymeric chain in order to take advantage of the beneficial effects obtained by using the phenylethynyl group.

With the present invention, however, it was found that the synthesis of the novel aromatic polyesters provided the means for introducing a phenylethynyl group to the polymer chain. This is accomplished by replacing the iodo groups of the polymer of this invention with a phenylethynyl group using copper phenyl acetylide. The resulting polymers, after thermal cure, show increased heat and chemical stability and are insoluble.

The preparation of the polymers containing a phenylacetyleneyl group is illustrated by Example II.

EXAMPLE II

One gram of the diiodo polymer of Example I was dissolved in 100 ml of pyridine. A little excess of cuprous phenylacetylide was added to the polymer solution while the mixture was refluxing under deoxygenated nitrogen. The reaction mixture was refluxed in a nitrogen atmosphere for 48 hours. After the reaction, the mixture was cooled to room temperature and poured into 400 ml conc. hydrochloric acid (with ice). The solid was filtered and washed with a large amount of water, then was dried and was dissolved in 20 ml of 1,1,2,2-tetrachloroethane. The polymer was reprecipitated by large amounts of methanol. The final product was dried in vacuum at 90° C. overnight.

The cuprous phenylacetylide was conventionally prepared by treating an ammonical solution of cuprous chloride with an alcoholic solution of phenylacetylene.

A thin film was prepared from the phenylethynyl containing polymers using a solution of 1 g polymer in 15 ml of 1,1,2,2-tetrachloroethane. This solution was cast on a glass plate at 110° C. to remove the solvent. After releasing, the brown, semi-transparent film was dried in vacuum. Curing was carried out by putting the phenylethynyl containing polymer in nitrogen atmosphere at 270° C. for 30 hours.

The polyaromatic esters of this invention were tested by heating them in an air circulated oven at 300° C. for three days. The weight loss was determined by weighing the sample before and after the heat treatment and after cooling to room temperature in a dessicator.

The softening temperature of the polymer was measured by Vicat-type apparatus under a load on the sample of 44.9 psi with a heating rate of 1° C./min.

The polymers prepared in accordance with this invention were also studied for their thermal stabilities by oxidative isothermal aging. Table III shows the weight losses of various polyesters after isothermal aging at 300° C. for three days.

Table III also lists softening temperatures of polymers under a load on the sample of 44.9 psi. Iodine-containing polymers have softening temperatures around 185° C. with only a slight variation in polymer compositions.

Polymer P-X and P-XI are polymers P-I and P-III, respectively, with iodine replaced by the phenylacetylene group. These polymers show a relatively lower softening temperature of 170° C. and 160° C., possibly because of the bulky effect of the phenylacetylenyl groups. After curing, the softening temperature of polymers P-X and P-XI increased to 190° C. and 181° C., respectively.

TABLE III

| | THERMAL AND HEAT STABILITIES OF POLYMERS | | | |
|---|---|---|---|---|
| | Weight Loss wt at 300° for 3 days | | Softening point °C. | |
| Polymer | Before Curing | After Curing | Before Curing | After Curing |
| P-I | 8.1 | — | 190–195 | — |
| P-II | 10.9 | — | 195–200 | — |
| P-III | 11.2 | — | 192–197 | — |
| P-IV | 10.1 | — | 185–190 | — |
| P-V | 10.6 | — | 180–195 | — |
| P-VI | 11.2 | — | 183–188 | — |
| P-VII | 7.4 | — | 200–205 | — |
| P-VIII | 6.5 | — | 185–190 | — |
| P-IX | 7.9 | — | 190–195 | — |
| P-X* | 5.7 | 2.3 | 170 | 190 |
| P-XI* | 4.8 | 2.1 | 160 | 181 |

*Polymers with phenylacetylenyl groups.

It should be understood by those skilled in the art to which the present invention pertains that while the process and novel polymers described herein illustrate preferred embodiments of the invention, various modifications and alterations may be made without departing from the spirit and scope thereof, and that all such modifications as fall within the scope of the appended claims are intended to be included herein.

What is claimed is:

1. A process for synthesizing polyaromatic esters which comprises the steps of (A) forming a reaction mixture composed of equi-molar proportions of (1) a mixture 2,2'-diiododiphenyl-4,4'-dicarbonyl dichloride, isophthaloyl chloride, and terephthaloyl chloride; and (2) a dihydric phenol selected from the group consisting of 4,4'-isopropylidenediphenol, 4,4'-sulfonyldiphenol and resorcinol; (B) effecting a two-phase condensation reaction between said (1) and (2) to form a reaction product; and (C) separating the resultant reaction product.

2. A process in accordance with claim 1 wherein said dihydric phenol is 4,4'-isopropylidenediphenol.

3. A process in accordance with claim 1 wherein said dihydric phenol is 4,4'-sulfonyldiphenol.

4. A process in accordance with claim 1 wherein said dihydric phenol is resorcinol.

5. A process for synthesizing polyaromatic esters which comprise the steps of (A) forming a reaction mixture composed of equi-molar proportions of (1) a mixture of 2,2'-diiododiphenyl-4-4'-dicarbonyl dichloride and isophthaloyl chloride; and (2) a dihydric phenol selected from the group consisting of 4,4'-sulfonyldiphenol, 4,4'-isopropylidenediphenol and resorcinol; (B) effecting a two-phase condensation reaction between said (1) and (2) to form a reaction product; and (C) separating the resultant reaction product.

6. A process in accordance with claim 5 wherein said dihydric phenol is 4,4'-isopropylidenediphenol.

7. A process in accordance with claim 5 wherein said dihydric alcohol is 4,4'-sulfonyldiphenol.

8. A process in accordance with claim 5 wherein said dihydric phenol is resorcinol.

9. A process for synthesizing polyaromatic esters which comprises the steps of (A) forming a reaction mixture composed of equi-molar proportions of (1) a mixture of 2,2'-diiododiphenyl-4,4'-dicarbonyl dichloride and terephthaloyl chloride; and (2) a dihydric phenol selected from the group consisting of 4,4'-isopropylidenediphenol, 4,4'-sulfonyldiphenol and resorcinol; (B) effecting a two-phase condensation reaction between said (1) and (2) to form a reaction product; and (C) separating said reaction product.

10. A process in accordance with claim 9 wherein said dihydric phenol is 4,4'-isopropylidenediphenol.

11. A process in accordance with claim 9 wherein said dihydric phenol is 4,4'-sulfonyldiphenol.

12. A process in accordance with claim 9 wherein said dihydric phenol is resorcinol.

* * * * *